Oct. 29, 1957    H. E. STANTON    2,811,487
NEUTRON REACTOR HAVING A X C135 SHIELD
Filed Dec. 3, 1946
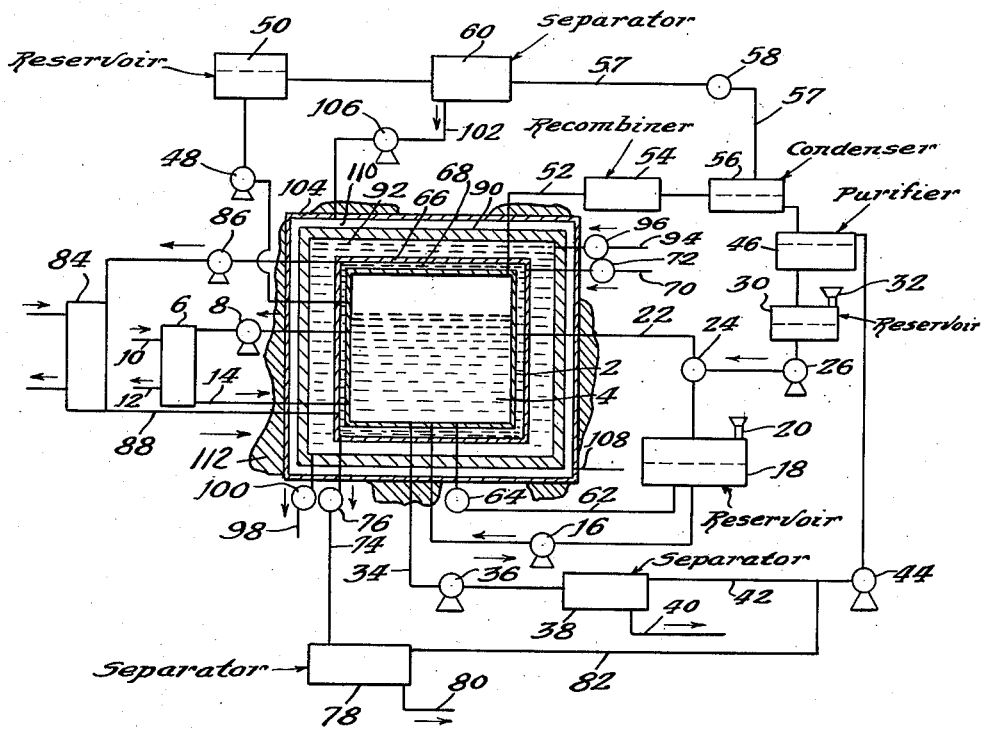
Witness:
Walter S. Schlegel, Jr.
INVENTOR.
Henry E. Stanton
BY
Robert A. _____
Attorney.

10

United States Patent Office 2,811,487
Patented Oct. 29, 1957

2,811,487

NEUTRON REACTOR HAVING A $Xe^{135}$ SHIELD

Henry E. Stanton, Chicago, Ill., assignor to the United States of America as represented by the United States Atomic Energy Commission Application December 3, 1946, Serial No. 713,653

1 Claim. (Cl. 204—193.2)

This invention relates to neutronic reactors, and more particularly to a novel method and means for shielding such reactors against the flow of neutrons therefrom.

A general object of the invention is to provide a novel lightweight neutron shield around a neutronic reactor.

Another object of the invention is to continuously withdraw from a neutronic reactor a highly neutron-absorbent fission product formed therewithin and to dispose said product around the reactor, externally thereof, for the purpose of absorbing neutrons emanating therefrom.

Still another object of the invention is to provide a novel composite neutron shield consisting of an inner layer of neutron moderator adapted to slow escaping neutrons to relatively low energy values, and an outer layer of $Xe^{135}$ which has an extremely great capture cross section for the slowed neutrons emanating from the inner layer.

In neutronic reactors a neutron fissionable isotope, such as $U^{233}$, $U^{235}$, or $94^{239}$, or mixtures thereof is subjected to fission by absorption of neutrons, and a self-sustaining chain reaction is established by the neutrons evolved by the fission. In general, such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction and is removed by passage of a coolant through the reactor in heat exchange relationship therewith. Specific details of the theory and essential characteristics of such reactors are set forth in the co-pending application of Enrico Fermi and Leo Szilard, Serial No. 568,904, filed December 19, 1944, now Patent No. 2,708,656.

The ratio of the fast neutrons produced in one generation by the fissions to the original number of fast neutrons producing the fission in a system of infinite size from which there can be no escape is called the multiplication constant and is denoted by the symbol $k$. In a system of finite size, the ratio of the number of neutrons in one generation to the number of neutrons in the preceding generation is called the reproduction ratio of the system, and is a constant designated by the symbol $r$. Usually this constant is expressed without regard to localized neutron absorbers such as control or limiting rods, which are not uniformly dispersed throughout the entire system. The neutron reproduction ratio $r$ is an actual value for a finite system, and differs from $k$ by a factor due to loss of neutrons through leakage and through absorption by localized neutron absorbers. To maintain a chain reaction, $r$ must be at least equal to one. As pointed out in the above-mentioned Fermi-Szilard application, it is preferably maintained below about 1.01 during operation of the reactor.

In order that a self-sustaining neutronic chain reaction can be established and maintained, the losses of neutrons must be held to a value so low that at least one neutron is available for a new fission, after losses have been deducted, per neutron consumed in production of fission. In fission of $U^{235}$ and similar isotopes, more neutrons are evolved per fission than are required to produce the fission. For example, about 2.3 neutrons are evolved per neutron consumed in fission of $U^{235}$, and about 2.8 neutrons are evolved per neutron consumed in fission of $94^{239}$. These evolved neutrons are used up in fission of further $U^{235}$ or $94^{239}$ atoms, or are lost to the reaction. If losses do not reduce the ratio of neutrons evolved to neutrons consumed and lost below one, the chain reaction will continue.

Losses may be external, as when neutrons escape from the reactor, or internal. Internal losses are caused by absorption of neutrons by atoms which do not fission when the neutron has been absorbed.

$U^{238}$ present in natural uranium absorbs substantial quantities of neutrons to produce $94^{239}$. This loss may be substantially reduced by use of uranium aggregates. Thus, it has been found that $U^{238}$ absorbs neutrons to an appreciable degree at energies (resonance energies) greater than thermal energies due to its relatively high capture cross section with respect to that of $U^{235}$ at such resonance energies. However, this type of absorption, known as resonance absorption, may be reduced by decreasing the amount of neutrons which pass into a uranium body until these neutrons have been slowed to thermal energy. This may be done by reducing the ratio of surface area per unit weight of uranium, i. e., by using natural uranium in the form of aggregates preferably having a minimum thickness of about 0.5 cm. Moreover, this loss may be rendered negligible by use of a concentrate of a fissionable isotope which contains greater than natural concentration of fissionable material.

Neutron moderators also absorb neutrons. Generally speaking, it is desirable to use as a moderator an element (or compound thereof) of low atomic weight and low neutron capture cross section. The ability to slow down neutrons may be expressed by what is known as the scattering cross section, whereas the ability to absorb or capture neutrons may be expressed as the capture cross section. The ratio of absorption cross section to scattering cross section of various materials are approximately as follows:

| | |
|---|---|
| Light water ($H_2O$) | 0.00478 |
| Diphenyl | 0.00453 |
| Beryllium | 0.00127 |
| Graphite | 0.000726 |
| Heavy water ($D_2O$) | 0.00017 |

For natural uranium it is preferred to use materials wherein the above ratio is below about 0.004. However, with enriched uranium compositions containing more than natural amounts of $U^{235}$, a greater latitude is permissible. Using carbon or deuterium oxide as moderators and natural uranium as the fissionable composition, only about 1.1 or 1.3, respectively, neutrons are obtained per neutron consumed due to neutron losses in the $U^{238}$ and the moderator. Since the external neutron losses may be substantial, other internal neutron losses should be held sufficiently low to prevent these losses from rising so high as to prevent the reaction.

Other components of the reactor including the coolant, impurities in the uranium or other portions of the system, moderator, control or limiting rods, fission fragments, restraining barrier, etc. absorb neutrons in varying amounts depending upon their neutron capture cross-section.

The effect of these impurities or absorbers in a reactor containing natural uranium as the fissionable component has been approximately evaluated for each element as a danger coefficient. This coefficient is computed according to the formula $$\frac{T_i}{T_u} \cdot \frac{A_u}{A_i}$$

where $T_i$ represents the cross-section for absorption of thermal neutrons of the impurity, $T_u$ represents the cross-section for absorption of thermal neutrons of the uranium, $A_i$ represents the atomic weight of the impurity of neutron absorber, and $A_u$ represents the atomic weight of uranium.

The following table gives presently known values for various elements having their natural isotopic content.

| Element | Danger Coefficient | Element | Danger Coefficient |
|---|---|---|---|
| $H^1$ | 10 | Mo | 1.0 |
| $D^2$ | 0.01 | Ru | 2 |
| He | 0 | Rh | 50 |
| Li | 310 | Pd | .2 |
| Be | 0.04 | Ag | 18 |
| B | 2,150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | .3 | I | 1.6 |
| Na | 0.65 | Xe | 6 |
| Mg | 0.48 | Cs | 8.7 |
| Al | 0.30 | Ba | 0.30 |
| Si | 0.26 | La | 2.4 |
| P | 0.3 | Ce | 2.4 |
| Cl | 31 | Nd | 17 |
| A | 0.8 | Sm | 1,430 |
| K | 2.1 | Eu | 435 |
| Ca | 0.37 | Gd | 6,320 |
| Sc | 7 | Tb | 20 |
| Ti | 3.8 | Dy | 200 |
| V | 4 | Ho | 10 |
| Cr | 2 | Er | 40 |
| Mn | 7.5 | Tm | 20 |
| Fe | 1.5 | Yb | 10 |
| Co | 17 | Lu | 30 |
| Ni | 3 | Hf | 20 |
| Cu | 1.8 | Ta | 4.6 |
| Zn | 0.61 | W | 2.7 |
| Ga | 1 | Re | 18 |
| As | 2 | Os | 1.7 |
| Se | 6.3 | Ir | 70 |
| Br | 2.5 | Pt | 2.5 |
| Kr | 6 | Au | 16 |
| Rb | 0.4 | Hg | 82 |
| Sr | 0.57 | Tl | 0.5 |
| Y | 0.4 | Pb | 0.03 |
| Zr | 0.13 | Bi | 0.0025 |
| Cb | 0.4 | Th | 1.1 |

The exceedingly large thermal neutron capture cross-section of $Xe^{135}$ suggests the possibility of its use as a light weight shield for a neutronic reactor. If this possibility can be realized, great economies in weight and cost can be effected in the shielding problem through the elimination of massive concrete, etc.

It is well known that the thickness of a neutron absorbing material for a given transmission (i. e. the ratio of the emerging neutron flux to the impinging flux) varies inversely with the product of the density of the absorber and its danger coefficient. Consequently, if $x$ represents the thickness of an absorber, $\rho$ and K its density and danger coefficients respectively, $$x \sim \frac{1}{\rho K} \quad (1)$$

Two different absorbers, designated by subscripts 1 and 2, may then be compared for the same transmission by the equation, $$\frac{x_1}{x_2} = \frac{\rho_2 K_2}{\rho_1 K_1} \quad (2)$$

Using this relation, the following table may be constructed, (subscript 1 referring to $Xe^{135}$).

| Element | $\rho$, g./cc. | K | $x_1/x_2$ |
|---|---|---|---|
| Boron | 2.5 | 2,150 | 1.49 |
| Iron | 7.9 | 1.5 | .0033 |
| Cadmium | 8.65 | 870 | 2.09 |
| Samarium | 7.7 | 1,430 | 2.78 |
| Gadolinium | 7.7 | 6,320 | 13.5 |
| Mercury | 13.6 | 82 | .31 |
| Xenon$^{135}$ | .006 | $2.5 \times 10^6$ | 1 |

As an example of the use of this table, a shield thickness of 0.0033 cm of $Xe^{135}$ in the form of a gas at normal temperature and pressure will transmit thermal neutrons the same as 1.0 cm. of iron. In other words, the fraction of neutrons absorbed in 0.0033 cm. of $Xe^{135}$ is the same as in a 1.0 cm. thickness of iron.

For purposes of shielding, the total mass of material is important. If the total mass of an absorber is designated by M, it follows from (2) that $$\frac{M_2}{M_1} = \frac{K_1}{K_2} \quad (3)$$

for the same transmission. Substitution into this equation from the table gives the following table:

| Element | $\frac{M_2}{M_1}$ |
|---|---|
| Boron | 1,160 |
| Iron | $1.67 \times 10^6$ |
| Cadmium | 2,870 |
| Samarium | 1,750 |
| Gadolinium | 395 |
| Mercury | 30,500 |

As an example, if 10 tons of iron is required to shield a pile, the same shielding could be accomplished with six grams of $Xe^{135}$.

In view of the fact that $Xe^{135}$ decays with a half life of 9.5 hours, it is necessary to replenish it at frequent intervals to supply losses from decay, and also losses due to destruction by capture of the escaping neutrons. Under certain circumstances, these losses may be supplied by the reactor itself. Between 3% and 5% of all fissions lead to the formation of $Xe^{135}$, and it is possible to recover a substantial portion of this gas in certain types of reactors.

On the other hand, each fission produces approximately two neutrons, one of which must be used, on the average, to maintain the chain reaction. The excess neutrons must either be absorbed in the interior of the reactor or eventually leak out of the reactor. In consequence, the $Xe^{135}$ in the shield can only absorb less than 5% of the neutrons generated by the fissions in order to regenerate the shield at a sufficient rate to maintain it.

An alternative procedure would be to generate $Xe^{135}$ by the bombardment with neutrons of $Xe^{134}$, a stable isotope with an abundance of about 10%, but this is economically not feasible at present.

An operative structure hereinafter described comprises a homogeneous liquid pile so loaded with absorbers (as thorium) that the neutron multiplication constant for the infinite pile would not exceed about 1.03. The $Xe^{135}$ generated is taken off continuously by sweeping it out with the other gases, or other means, and subsequently led into the shield space. The whole assembly is preferably surrounded by lead or other suitable material to shield against $\gamma$ and other radiations. The $Xe^{135}$ shield surrounds the reflector which adequately slows the fast neutrons generated in the active portion.

The foregoing and other objects and advantages of the invention will be readily apparent from a consideration of the following specification and the accompanying drawing which comprises a flow diagram illustrating the invention as applied to a system wherein the reactive composition and the neutron absorber are in fluid form.

The reactor, diagrammatically illustrated in the drawing, comprises a suspension such as a solution or slurry of a fissionable material in a liquid moderator. For example, a solution of uranylsulphate in water is chain reacting where the solution fills a spherical reactor 12 inches in diameter and surrounded with an efficient neutron reflector and where the reactor contains at least 575–600 grams of $U^{235}$ as a uranium concentrate containing about 15% $U^{235}$ based upon the total uranium. Higher amounts of $U^{235}$ for example 600–700 or more grams are required where the reflector contains a neutron absorber as in the present instance. Moreover, other solutions such as solutions of uranyl fluoride, uranyl nitrate, plutonyl sulphate ($PuO_2SO_4$) may be used where the fissionable isotope content of the plutonium or uranium is above about 5–15% of the uranium or equivalent composition. In addition, natural uranium compounds (uranyl fluoride $UO_2$ or $U_3O_8$) may be dispersed or dissolved in heavy water ($D_2O$) to establish a chain reaction.

The shape of the reactor may be cylindrical as shown by the drawings or may be spherical or other form. A slender elongated cylinder is particularly advantageous where maximum leakage is desired in order to secure a maximum of neutrons for bombardment of the neutron absorbent or target isotope or isotopes.

In the figure, a reactor tank or chamber 2 of low neutron absorbing material, for example stainless steel or aluminum, is provided. This tank is sufficiently thin (for example ⅛ inch or less) to permit passage of neutrons therethrough without substantial absorption of neutrons. The tank contains a chain reacting liquid composition 4 such as above-mentioned.

The reactive composition is continuously circulated through a heat exchanger 6 by means of a pump 8 having its suction side connected to the tank 2. The discharge side of the pump is connected to the heat exchanger 6 through which the reactive composition is passed in heat exchange relationship with a coolant circulated through the heat exchanger by inlet and outlet pipes 10 and 12. The cooled composition is returned to the tank 2 through a return line 14.

The amount of reactive composition within the tank 2, as well as the concentration of uranium-containing material in the composition, is controlled by a system including a reversible delivery pump 16 connected to the bottom of the tank 2 and to a reservoir 18 having an inlet 20 to accommodate the introduction of uranium-containing material into said reservoir 18. The reservoir 18 is connected to the tank 2 through a line 22 having a conventional three-way operating valve 24 connected to the discharge side of a pump 26, the suction side of which is connected to a moderator reservoir 30 having an inlet 32 through which moderator may be conveyed to this reservoir.

The reactive composition 4 is continuously withdrawn from the bottom of the tank 2 through an outlet line 34 connected to the suction side of a pump 36, the discharge side of which is connected to a conventional separator device 38 adapted to separate the moderator from the uranium-containing material. Such a separator may comprise an evaporator or settling tank and the separated material may be conveyed from the device 38 by an outlet line 40 for recovery of 94 and fission products formed as a result of the neutronic reaction where natural uranium or $U^{235}$–$U^{238}$ mixtures are used within the tank 2. Separated moderator is conveyed from the separator device 38 through a line 42 including a pump 44, the discharge side of which is connected to a moderator purifier 46 from which the purified heavy water is conveyed to the before-mentioned reservoir 30. The purification may be effected by various means such as by distillation.

It will be understood that the water within the tank 2 is continuously decomposed into $D_2$ and $O_2$ or $H_2$ and $O_2$, depending upon the type of water used, as a result of the neutronic reaction; and these decomposition products, as well as gaseous fission products of the reaction including $Xe^{135}$, are swept from the tank 2, and the decomposition products are recombined. A gas pump or blower 48 is provided having its suction side connected to a helium reservoir 50, and its discharge side connected to the tank 2 above the level of the reactive composition therein. The helium passes through the tank 2 and is conveyed therefrom by an outlet line 52 connected to a conventional recombiner device 54 adapted to recombine the hydrogen isotope or isotopes and $O_2$ into vaporized $D_2O$ or $H_2O$ which is conveyed to a condenser 56, the condensed $D_2O$ or $H_2O$ being conveyed to the before-mentioned purifier tank 46. Helium is conveyed from the condenser 56 by a line 57, preferably including a pump or blower 58, to a separator tank 60 for removal of gaseous fission products and thence to the helium reservoir 50.

An emergency dump line 62 is connected to the tank 2 and the reservoir 18, said line including a dump valve 64 adapted to be opened under emergency conditions to reduce the body of composition 4 within the tank 2 to a size smaller than that at which a chain reaction may be sustained.

It may be noted that the system, thus far disclosed, is purely illustrative and such systems are more fully described in co-pending application, Serial No. 613,356, filed August 29, 1945, in the United States Patent Office by Eugene P. Wigner, Leo A. Ohlinger, Gale J. Young and Harcourt C. Vernon and also in an application of Robert F. Cristy, Serial No. 623,363, filed October 19, 1945.

Surrounding the tank 2 is another tank or chamber 66 within which a production area or zone containing a fluid composition 68 to be bombarded by neutrons emanating from the reactor 2. This tank also is constructed of a low neutron absorber such as aluminum or stainless steel or other material having a danger coefficient below 10 and having a thickness, e. g., ⅛ inch or less, sufficiently low to prevent substantial neutron absorption by the tank 66. The composition 68 may be a slurry or solution of the neutron absorbent material, such as thorium, in a neutron moderator such as heavy water, said composition being admitted to the chamber 66 through an inlet line 70 including a conventional shut-off valve 72. After the composition 68 has been bombarded for the desired length of time, it is conveyed from the chamber 66 by an outlet line 74 including a conventional drain valve 76 to a conventional separator device 78 adapted to separate the heavy water from the neutron absorbent material which has at this point been converted to a radioactive isotope by the capture of neutrons as above discussed. The radioactive material is conveyed from the separator 78 by a line 80, and the separated moderator is conveyed from the device 78 by a line 82 connected to the suction side of the before-mentioned pump 44 which thus urges the heavy water from the line 82 to the before-mentioned purifier tank 46. It will be understood that the presently illustrated system will be used when the same moderator is used in tanks 2 and 66 and that where different moderators are used different purifiers may be required.

The bombarded composition 68 is preferably circulated through a heat exchanger 84 by a pump 86 having its suction side connected to the chamber 66, the cooled composition being returned to the chamber 66 through a return pipe or line 88.

The chambers 2 and 66 are disposed within an aluminum or steel tank or chamber 90 containing a heavy water neutron reflector 92 adapted to reflect escaping neutrons back into the chamber 66 and/or reactor 2. The heavy water 92 is conveyed to the tank 90 through an inlet line 94 having a conventional shut-off valve 96 and is conveyed from the tank by an outlet line 98 having a conventional drain valve 100.

The gaseous fission products which are separated from the helium in the separator 60 are pumped through a line 102 into a shield tank 104 by a pump having its discharge side connected to said tank. These fission products are expelled from the tank through an outlet line 108 which is connected to an exhaust stack (not shown).

It will be understood that in a system such as above described $Xe^{135}$ constitutes about 25%–33% of the gaseous fission products swept from the chamber 2. Thus the shield chamber 110 formed between the tanks 90 and 104 must be about four times as thick as above described to replace an equivalent thickness of iron. In other words, approximately 0.0132 cm. of gas within the shield chamber 110 is equivalent to 1 cm. thickness of iron.

It may be noted that the reflector 92 and the gaseous fission products within the tank 104 constitute a composite shield in that the neutron moderator 92 is effective to reduce fast neutrons emanating from the neutronic reactor to relatively slow energy values at which they are readily absorbed by $Xe^{135}$ within the chamber 110. Thus very few neutrons escape from the tank 104 and these are preferably absorbed by a relatively thin shield 112 of lead around this chamber adapted to absorb game and other biological radiations.

Thus, it will be understood that I have designed a novel lightweight neutron shield which is capable of effectively shielding operating personnel from neutrons emanating from a neutronic reactor. Preferably this lightweight $Xe^{135}$ shield within the chamber 110 is provided, as above described by extracting this isotope from the reactive composition undergoing a chain reaction. However, it will be readily understood that if desired the $Xe^{135}$ may be produced by bombarding $Xe^{134}$ with neutrons and the chamber 110 may be filled with substantially pure $Xe^{135}$, an arrangement which would greatly reduce the thickness of the shield within the chamber 110.

It will be understood that the above-described embodiment of the invention is merely by way of illustration and not limitation inasmuch as various and other forms of the invention will be readily apparent to those skilled in the art without departing from the spirit of the invention or the scope of the appended claim.

What is claimed is:

A system of the class described, comprising a neutronic reactor comprising a reactor tank containing a substantially homogeneous composition of thermal neutron fissionable material and liquid neutron moderator, a neutron reflector comprising a tank containing heavy water surrounding said reactor, a shield tank surrounding said reflector, a gamma ray shield surrounding said shield tank, and means for conveying gaseous fission products including $Xe^{135}$ from the reactor chamber to the shield tank including a helium reservoir, a blower for blowing helium gas through said reactor chamber, a recombiner, a condenser, and a separator tank for separating helium from the gaseous fission products.

References Cited in the file of this patent

UNITED STATES PATENTS

| 2,708,656 | Fermi et al. | May 17, 1955 |
| 2,716,705 | Zinn | Aug. 30, 1955 |
| 2,743,225 | Ohlinger et al. | Apr. 24, 1956 |

FOREIGN PATENTS

| 861,390 | France | Oct. 28, 1940 |
| 233,011 | Switzerland | Oct. 2, 1944 |

OTHER REFERENCES

"Atom Movements," pub. by American Society for Metals, 1951, Cleveland, Ohio, p. 175.

Introduction to Nuclear Eng., by Richard Stephenson, McGraw-Hill Book Co., New York, 1954, pp. 270–274.

Smyth: A General Account of the Development of Methods of Using Atomic Energy for Military Purposes Under the Auspices of the U. S. Government 1940–1945; p. 108, August 1945, also pp. 85, 102, 103.

Business Week, Sept. 1, 1945, pp. 58–64.

Katcoff: MDDC 293. Date of Manuscript April 1956; date declass. Sept. 11, 1946; 14 pages.

Kelly et al.: Physical Review, 73, 1135–9 (1948).

Hackh's Chemical Dictionary, revised by Julius Grant, 3rd ed., 1950, Blakiston Co., Philadelphia, p. 916.